Patented June 6, 1950

2,510,295

UNITED STATES PATENT OFFICE 2,510,295

ETHANOL ROSIN AMINES

Ronald Rosher, Wilmington, Del., assignor to Hercules Powder Company, Wilmington, Del., a corporation of Delaware No Drawing. Application December 18, 1948, Serial No. 66,152

18 Claims. (Cl. 260—100)

This invention relates to ethanol rosin amines and to the method for their preparation by the reaction between a rosin amine and ethylene oxide.

When rosin amine is condensed with ethylene oxide in the presence of a catalyst the product is a waxlike composition. This waxlike composition is composed of polyethylene glycol, unreacted rosin amine and ethylene oxide condensates of rosin amine. Ethanol rosin amines appear to be absent and cannot be prepared by the direct reaction of rosin amine with ethylene oxide following prior art procedures. If less than the theoretical amount of ethylene oxide is added to the rosin amine to avoid the waxlike product, there is a large excess of unreacted rosin amine, and all of the reacted ethylene oxide appears to be combined as high molecular weight condensates of ethylene oxide. Neither mono- nor diethanol rosin amines have even been detected in compositions prepared by the condensation of rosin amine with ethylene oxide by these prior art methods. This is not surprising in view of the greater reactivity of hydroxyl hydrogen than amino hydrogen in the presence of catalysts of the prior art.

Now in accordance with this invention it has been found that an ethanol rosin amine may be prepared in a relatively high state of purity by reacting a rosin amine with a chemically equivalent amount of ethylene oxide in the presence of a volatile aliphatic alcohol.

Monoethanol rosin amine is produced by reacting a rosin amine with one molecular proportion of ethylene oxide, and diethanol rosin amine is produced by reacting a rosin amine with two molecular proportions of ethylene oxide.

Both mono- and diethanol rosin amines are clear balsam-like liquids which flow slowly at room temperature but are much more viscous than the rosin amines from which they are made.

The preparation of the ethanol rosin amines of this invention is further illustrated by the following examples wherein all parts are parts by weight unless stated otherwise.

Example I

A solution of 140 parts ethylene oxide dissolved in 1000 parts anhydrous ethyl alcohol was added slowly at room temperature to a solution of 1000 parts dehydrogenated rosin amine (chiefly dehydroabietylamine) in 1000 parts anhydrous ethyl alcohol. The temperature rose slowly from an initial temperature of 24° C. to a final temperature of 46° C. during this addition. After the reaction was completed, as indicated by a drop in temperature, the alcohol was distilled off. The residue which was crude monoethanoldehydroabietylamine was a clear, pale amber viscous fluid having a neutral equivalent of 370–372 when titrated electrometrically in alcohol solution with alcoholic hydrochloric acid. The residue amounted to 1139 parts by weight.

A portion of the crude monoethanoldehydroabietylamine was distilled under 1 mm. mercury pressure. A forerun amounting to 4% of the charge distilled over the range 180–205° C. This was a mixture of oils and small amounts of rosin amine and diethanol rosin amine. The monoethanoldehydroabietylamine amounting to 80% of the charge boiled within the range of 230–250° C. (1 mm. pressure). The residue containing products of decomposition due to the temperature of heating during the distillation and a small amount of diethanoldehydroabietylamine amounted to 16% of the charge.

To a solution of 230 parts crude monoethanoldehydroabietylamine N.E. 370–372 prepared as above dissolved in 500 parts ethyl alcohol was added 28 parts ethylene oxide dissolved in 500 parts ethyl alcohol. The temperature was gradually raised to 70° C. over a one-hour period, and then the alcohol was distilled off to recover as a residue 257 parts diethanoldehydroabietylamine as a pale amber fluid which was only slightly more viscous than monoethanoldehydroabietylamine. A sample of this product when subjected to distillation at 1 mm. mercury pressure yielded only 7% of the charge that was distillable at a pot temperature below 300° C. Diethanoldehydroabietylamine is not readily distillable without decomposition at 1 mm. pressure.

Example II

A solution of 160 parts dehydrogenated rosin amine consisting chiefly of dehydroabietylamine in 400 parts ethyl alcohol was heated to 50° C., and gaseous ethylene oxide was bubbled into the solution. When the temperature due to the reaction rose to 65° C., the rate of addition of the ethylene oxide was adjusted to prevent further rise in temperature. When the heat of reaction was no longer sufficient to maintain the temperature, heat was applied to maintain a temperature within the range of 65–80° C., and the addition of ethylene oxide was continued until no further reaction took place. The diethanol dehydrogenated rosin amine was recovered by distilling off the alcohol and dissolved ethylene oxide under reduced pressure. The yield of diethanol dehydrogenated rosin amine consisting chiefly of diethanoldehydroabietylamine amounted to 200 parts.

Example III

A solution of 60 parts dehydrogenated rosin amine in 60 parts butanol was treated with ethylene oxide gas at room temperature, the ethylene oxide being bubbled into the solution. The temperature rose to 48° C. and was held at that temperature by controlling the rate of flow of the ethylene oxide. After about 11 parts ethylene oxide had been absorbed, the heat of reaction was insufficient to maintain the temperature. The temperature was then raised to 60° C. and ethylene oxide was added in the same manner until the reaction was complete. The alcohol was then distilled off to obtain the diethanol dehydrogenated rosin amine as a viscous fluid amounting to 78 parts by weight.

This example was repeated using isopropyl alcohol, 95% ethyl alcohol and methyl alcohol as solvents in place of butyl alcohol with substantially the same results.

Example IV

Ethylene oxide was bubbled into a solution of 60 parts dehydrogenated rosin amine in 60 parts benzene at room temperature. There was no temperature rise and no condensation of the ethylene oxide. To this solution was then added 10 parts ethyl alcohol. There was an immediate temperature rise. Ethylene oxide was then added at 60° C. until absorption was complete. After distilling off the volatile solvents there was obtained 99 parts diethanol dehydrogenated rosin amine.

Example V

Ethylene oxide gas was bubbled into a solution of 922 parts hydrogenated rosin amine (chiefly dihydroabietylamine) dissolved in 1000 parts ethyl alcohol. The temperature rose rapidly to 78° C. where it was held for 6 hours while the ethylene oxide was being added. At the end of this reaction period the solvent was distilled off, and 1170 parts diethanol hydrogenated rosin amine was recovered as a viscous fluid.

Example VI

Ethylene oxide was bubbled into a solution of 1500 parts dehydrogenated rosin amine in anhydrous ethanol at 70° C. until about 350 parts ethylene oxide had been absorbed. The alcohol was then removed and the diethanol dehydrogenated rosin amine was subjected to distillation. A fraction boiling below 234° C. (0.1 mm. mercury) and amounting to 3% of the charge was rosin oil. The diethanoldehydroabietylamine distilled over within the range of 234° C. (0.1 mm. mercury) to 248° C. (0.2 mm. mercury). It contained by analysis 3.6% nitrogen.

The above examples show that the condensation between a rosin amine and ethylene oxide will take place readily in the presence of any of the lower aliphatic alcohols. Using the evolution of heat as an indication of reaction it has been shown that reaction will also take place when higher alcohols are used. It is desirable, however, to use only alcohols which are sufficiently volatile to be readily removed from the product. Although the alcohol does not appear to take part in the reaction a minimum amount of about 15% alcohol based on the rosin amine used appears to be critical. However, it is preferable to use sufficient alcohol to act as a solvent to give a fluid solution of rosin amine. Since ethylene oxide reacts with water to form polyethylene glycol, especially at the higher temperatures it is preferable that the alcohol be entirely waterfree.

Catalysts for the condensation of ethylene oxide with alcoholic hydroxyl groups such as sodium and potassium alkoxides and hydroxides are avoided since they favor other reactions than the condensation of the ethylene oxide with the rosin amine.

The condensation of rosin amine with ethylene oxide in an alcohol solution will take place readily at temperatures as low as 20° C. as indicated by a temperature rise. The reaction goes smoothly within the temperature range of about 40–100° C. Higher temperatures may be used if desired without affecting the course of the reaction, provided the proper precautions are taken to provide for the heat evolved in the reaction. The reaction may also be carried out under pressure if desired.

One mole of ethylene oxide reacts with each mole of rosin amine to produce the monoethanol rosin amines of this invention. The first mole of ethylene oxide reacts with the liberation of a substantial amount of heat. Reaction with a second mole of ethylene oxide is much slower and is accompanied by much less heat rise. Consequently, it is not at all difficult to produce substantially pure monoethanol rosin amine by reacting the rosin amine with the theoretical amount of ethylene oxide. Since reaction of diethanol rosin amine with ethylene oxide to form glycol ethers does not take place under the conditions of this invention, it is likewise possible to prepare substantially pure diethanol rosin amine by reacting the theoretical amount of ethylene oxide with rosin amine in the presence of an aliphatic alcohol. If a slight excess of ethylene oxide is used, further reaction does not take place and the excess ethylene oxide may be removed by distillation.

The rosin amines from which the ethanol rosin amines of this invention are prepared are the rosin amines which are prepared by reacting ammonia with a natural rosin or a modified rosin to form the nitrile from the carboxyl group in the rosin and then hydrogenating the rosin nitrile or modified rosin nitrile to form the amine. The preparation of the nitrile may be carried out by passing gaseous ammonia into the molten rosin material and vaporizing the water as fast as it is formed in order to remove the water from the reaction mixture. Dehydration catalysts may be used to facilitate the reaction with ammonia, if desired. The nitrile is preferably purified by neutralization or distillation to make it suitable for hydrogenation to the amine as the presence of acidic materials frequently destroys the hydrogenation catalyst. The nitrile may be formed from any natural rosin or modified rosin such as gum rosin, wood rosin, hydrogenated rosin, dehydrogenated or disproportionated rosin, or heat-treated rosin. The rosin nitriles may likewise be made from the rosin acids which are major constituents of these rosins such as abietic acid, dihydroabietic acid, dehydroabietic acid, and tetrahydroabietic acid.

The rosin acid nitriles prepared from the natural or modified rosins or the corresponding rosin acids are readily hydrogenated to the amines. The hydrogenation is usually carried out by heating the rosin acid nitrile at about 150° to 200° C. with a Raney nickel catalyst under hydrogen pressure up to about 8000 lb/sq. in. The hydrogenation may also be carried out using other catalysts such as Raney cobalt, supported nickel or cobalt catalysts, and noble metal catalysts such as platinum, palladium, palladium on carbon, or reduced platinum oxide. The reaction may be carried out under hydrogen pressure of from about 200 to 8000 lb./sq. in. and at a temperature of from about 20° C. to about 200° C. Solvents may be used if desired and are preferable at the lower temperatures. The hydrogenation may also be carried out in the presence or absence of ammonia. Although the hydrogenation is ordinarily carried out only to the extent of hydrogenation of the nitrile group which hydrogenates quite readily, the hydrogenation may also be carried out under such conditions of temperature, pressure, and time of hydrogenation as to hydrogenate the rosin amines which are produced to convert them to hydrorosin amines which correspond to the amines produced from hydrogenated rosin via the nitriles.

The term "rosin amine" is used in this specification and claims to include broadly the primary amines derived from various rosins or rosin acids in the manner indicated whereby the carboxyl of the rosin or rosin acid is converted into a —CH₂NH₂ group. Rosin amines included within this scope are gum and wood rosin amines, derived respectively from gum and wood rosin and containing chiefly abietylamine; dehydrogenated rosin amine derived from dehydrogenated rosin and containing chiefly dehydroabietylamine; hydrorosin amine derived from hydrogenated gum or wood rosin and containing chiefly dihydro- and tetrahydroabietylamine; heat treated rosin amine derived from heat treated rosin; polymerized rosin amine derived from polymerized rosin; isomerized rosin amine derived from isomerized rosin and containing substantial amounts of abietylamine; and the rosin amines derived from the pure rosin acids, namely, abietylamine, dihydroabietylamine, dehydroabietylamine, and tetrahydroabietylamine. The ethanol derivatives of these rosin amines correspond to the above-designated primary amines wherein the nitrogen carries one or two ethanol radicals attached through the beta or 2 position of the ethanol radicals. They have the general formula

where R is the hydrocarbon radical corresponding to that occurring in the rosin acids including the abietyl, dihydroabietyl, tetrahydroabietyl and dehydroabietyl radicals and X is a radical selected from the group consisting of hydrogen and —CH₂CH₂OH. A monoethanol rosin amine is represented by the formula wherein X is a hydrogen, and a diethanol rosin amine is represented by the formula wherein X is a —CH₂CH₂OH radical.

The ethanol rosin amines are useful as intermediates for the formation of resins, and as corrosion inhibitors for acidic media. They are also converted by further reaction with ethylene oxide into highly valuable corrosion inhibitors. The novel diethanol rosin amines have the advantage over monoethanol rosin amines in being bifunctional and in being more readily dispersible in aqueous media. This advantage is carried over into their derivatives such as the polyglycol ethers of diethanol rosin amine, which are more readily dispersible than the corresponding products derived from monoethanol rosin amine.

What I claim and desire to protect by Letters Patent is:

1. As a new composition of matter an N-ethanol rosin amine in which no ethanol group is substituted.

2. As a new composition of matter an N-monoethanol rosin amine in which no ethanol group is substituted.

3. As a new composition of matter an N-diethanol rosin amine in which no ethanol group is substituted.

4. As a new composition of matter an N-diethanol dehydrogenated rosin amine in which no ethanol group is substituted.

5. As a new composition of matter an N-diethanol hydrorosin amine in which no ethanol group is substituted.

6. As a new composition of matter N,N-diethanolabietylamine.

7. As a new composition of matter N,N-diethanoldehydroabietylamine.

8. As a new composition of matter N,N-diethanoldihydroabietylamine.

9. The method of producing an ethanol rosin amine which comprises reacting ethylene oxide with a rosin amine in solution with at least 15% by weight of a volatile aliphatic alcohol and in the absence of an alkaline catalyst.

10. The method of producing a monoethanol rosin amine which comprises reacting one mole ethylene oxide with one mole rosin amine in solution with at least 15% by weight of a volatile aliphatic alcohol and in the absence of an alkaline catalyst.

11. The method of producing a diethanol rosin amine which comprises reacting two moles ethylene oxide with one mole rosin amine in solution with at least 15% by weight of a volatile aliphatic alcohol and in the absence of an alkaline catalyst.

12. The method of producing a diethanol rosin amine which comprises reacting two moles ethylene oxide with one mole dehydrogenated rosin amine in solution with at least 15% by weight of a volatile aliphatic alcohol and in the absence of an alkaline catalyst.

13. The method of producing a diethanol rosin amine which comprises reacting two moles ethylene oxide with one mole hydrogenated rosin amine in solution with at least 15% by weight of a volatile aliphatic alcohol and in the absence of an alkaline catalyst.

14. The method of producing a diethanol rosin amine which comprises reacting two moles ethylene oxide with one mole dehydroabietylamine in solution with at least 15% by weight of a volatile aliphatic alcohol and in the absence of an alkaline catalyst.

15. The method of producing a diethanol rosin amine which comprises reacting two moles ethylene oxide with one mole hydroabietylamine in solution with at least 15% by weight of a volatile aliphatic alcohol and in the absence of an alkaline catalyst.

16. The method of producing a diethanol rosin amine which comprises reacting two moles ethylene oxide with one mole dihydroabietylamine in solution with at least 15% by weight of a volatile aliphatic alcohol and in the absence of an alkaline catalyst.

17. The method of producing a monoethanol rosin amine which comprises reacting one mole ethylene oxide with one mole dehydrogenated rosin amine in solution with at least 15% by weight of a volatile aliphatic alcohol and in the absence of an alkaline catalyst.

18. The method of producing a monoethanol rosin amine which comprises reacting one mole ethylene oxide with one mole dehydroabietylamine in solution with at least 15% by weight of a volatile aliphatic alcohol and in the absence of an alkaline catalyst.

RONALD ROSHER.

REFERENCES CITED

The following references are of record in the file of this patent:

UNITED STATES PATENTS

| Number | Name | Date |
|---|---|---|
| 2,194,429 | Krzikalla | Mar. 19, 1940 |